United States Patent
Lewis

(10) Patent No.: US 10,119,071 B2
(45) Date of Patent: Nov. 6, 2018

(54) ENHANCED INVISIBLE-FLUORESCENT IDENTIFICATION TAGS FOR MATERIALS

(71) Applicant: UT-Battelle, LLC, Oak Ridge, TN (US)

(72) Inventor: Linda A Lewis, Andersonville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 371 days.

(21) Appl. No.: 15/003,871

(22) Filed: Jan. 22, 2016

(65) Prior Publication Data

US 2016/0362603 A1    Dec. 15, 2016

Related U.S. Application Data

(60) Provisional application No. 62/173,571, filed on Jun. 10, 2015.

(51) Int. Cl.
   *C09K 11/02* (2006.01)
   *C09K 11/06* (2006.01)

(52) U.S. Cl.
   CPC .............. *C09K 11/06* (2013.01); *C09K 11/02* (2013.01); *C09K 2211/1022* (2013.01); *C09K 2211/1074* (2013.01); *C09K 2211/187* (2013.01); *C09K 2211/188* (2013.01)

(58) Field of Classification Search
   CPC . C09K 11/02; C09K 11/06; C09K 2211/1022; C09K 2211/1074; C09C 5/22; C09C 7/20; C09C 11/17; C09C 11/32; C09C 11/328; B41M 3/144; B42D 2035/20; B42D 2033/2025; B42D 25/378; B42D 25/30
   See application file for complete search history.

(56) References Cited

U.S. PATENT DOCUMENTS

| | | | |
|---|---|---|---|
| 4,642,526 A | 2/1987 | Hopkins | |
| 5,336,714 A | 8/1994 | Krutak et al. | |
| 5,592,561 A | 1/1997 | Moore | |
| 5,939,468 A | 8/1999 | Siddiqui | |
| 5,990,197 A | 11/1999 | Escano et al. | |
| 6,149,719 A | 11/2000 | Houle | |
| 6,499,513 B1 | 12/2002 | Couch | |
| 6,513,921 B1 | 2/2003 | Houle | |
| 6,576,155 B1 | 6/2003 | Barbera-Guillem | |
| 6,861,012 B2 | 3/2005 | Gardner et al. | |
| 6,899,752 B2 | 5/2005 | Sekioka et al. | |
| 7,147,801 B2 | 12/2006 | Kozee et al. | |
| 8,403,223 B2 * | 3/2013 | Lewis | G06K 7/12 235/468 |
| 2003/0177941 A1 | 9/2003 | Barbera-Guillem | |
| 2004/0037947 A1 | 2/2004 | Patel et al. | |
| 2008/0161661 A1 | 7/2008 | Gizewski | |
| 2009/0045360 A1 | 2/2009 | Wosnick et al. | |
| 2010/0248245 A1 | 9/2010 | Ying et al. | |

FOREIGN PATENT DOCUMENTS

| | | |
|---|---|---|
| CN | 2265086 | 10/1997 |
| EP | 933407 | * 8/1999 |
| ES | 2147473 | 9/2000 |
| JP | 9234982 | 9/1997 |
| JP | 10251584 | 9/1998 |
| JP | 2003251907 | 9/2003 |
| WO | 20091369631 | 11/2009 |

OTHER PUBLICATIONS

C. Passariello, "Holograms Tell Fake From Fendi as Knock-Offs Get Better, Makers of Luxury Goods Reach for High-Tech Defense," The Wall Street Journal, 2006.
I. Ziljak, et al., "Design of Security Graphics with Infrared Colours," Science & Technology, 2008, pp. 24-31.

* cited by examiner

*Primary Examiner* — C Melissa Koslow
(74) *Attorney, Agent, or Firm* — Edna I. Gergel

(57) ABSTRACT

A tag composition includes a naphthalocyanine tag component that is invisible in light of the visible spectrum and which emits fluorescent light in a non-visible spectrum under a non-visible excitation energy, a binder for binding the tag to a surface of a material; and a solvent, wherein the tag component and the binder are dissolved in the solvent.

32 Claims, 8 Drawing Sheets

ENHANCED INVISIBLE-FLUORESCENT IDENTIFICATION TAGS FOR MATERIALS

CROSS-REFERENCE TO RELATED APPLICATIONS

This application claims priority to U.S. Provisional Patent Application No. 62/173,571 filed on Jun. 10, 2015, which is incorporated herein in its entirety by reference.

Specifically referenced is U.S. Pat. No. 8,403,223 issued on Mar. 26, 2013 to Linda A. Lewis, et al. entitled "Invisible-Fluorescent Identification Tags for Materials", the entire disclosure of which is incorporated herein by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

It is a well-known, common practice for foreign textile firms to use U.S. produced raw materials to manufacture their finished goods. When such goods are exported to America for sale under certain trade agreements, such goods are exempt from import tariffs. Some foreign manufacturers have been known to engage in fraudulent deception, falsifying country-of-origin certifications in order to avoid paying import tariffs. Moreover, foreign and domestic entities have been known to further engage in fraudulent deception, selling counterfeit products commonly known as "knock-offs" to the domestic and international public. Examples of knock-offs are high-end replicates of garments, pocket books, wallets, etc. Such fraudulent activities represent illegal denial of revenues rightfully owed to the government, legal manufacturers, and legal sellers of such goods.

Moreover, the reputations of legal manufacturers, legal sellers of such goods, and their product lines are at stake, as well as potential litigations that may result even though the companies are not at fault. Deceptive practices as described above result in many millions of dollars in lost revenue annually.

Reference is made to U.S. Pat. No. 8,403,223 issued on Mar. 26, 2013 to Linda A. Lewis, et al. entitled "Invisible-Fluorescent Identification Tags for Materials." An invisible-fluorescent preparation, called a tag or taggant, includes an invisible-fluorescent dye, such as an ink or paint, which, after application to a surface is invisible to the human eye under natural or room lighting, but fluoresce at a characteristic, invisible wavelength upon illumination by an appropriate light source. Tags are needed for use in identifying, without limitation, raw materials, textiles, apparels, garments, and other security or consumer products or parts.

Two deficiencies have been identified for a tag formulation proven heretofore to be most effective for marking textile products. Firstly, the formulation utilizes solvent carriers that are listed as Resource Conservation and Recovery Act (RCRA) hazardous waste and therefore are less desirable for use by manufacturers. Secondly, the formulation is sufficiently photo-sensitive to limit the useful lifetime thereof under exposure to either artificial or natural lighting.

In order to significantly advance the technology towards commercialization, objects and goals of the present invention include addressing the aforementioned deficiencies in order to produce an improved tag marking formulation that is considered non-hazardous and more robust in performance over time under typical lighting conditions anticipated for marked products.

BRIEF SUMMARY OF THE INVENTION

In accordance with one aspect of the present invention, the foregoing and other objects are achieved by a tag composition that includes a naphthalocyanine tag component that is invisible in light of the visible spectrum and which emits fluorescent light in a non-visible spectrum under a non-visible excitation energy, a binder for binding the tag to a surface of a material; and a solvent, wherein the tag component and the binder are dissolved in the solvent.

In accordance with another aspect of the present invention, a tag composition includes a tag component that is invisible in light of the visible spectrum and which emits fluorescent light in a non-visible spectrum under a non-visible excitation energy, said tag component comprising 2,3-naphthalocyanine bis(trihexylsilyloxide), a polystyrene binder for binding the tag component to a surface of a material, a solvent comprising α-terpinene, dimethyl sulfoxide, and acetone, wherein the tag component and the polystyrene binder are dissolved in said solvent; and at least one light-stabilizing additive selected from the group consisting of an ultraviolet light absorber, a hindered amine light stabilizer, a singlet oxygen inhibitor, and a singlet oxygen selective trap.

In accordance with a further aspect of the present invention, a tagged article includes a material having an invisible-fluorescent identification tag disposed on a surface thereof, the tag including a naphthalocyanine tag component that is invisible in light of the visible spectrum and which emits fluorescent light in a non-visible spectrum under a non-visible excitation energy, and a binder for binding the tag component to the surface of the material.

DETAILED DESCRIPTION OF THE INVENTION

Figure 1:
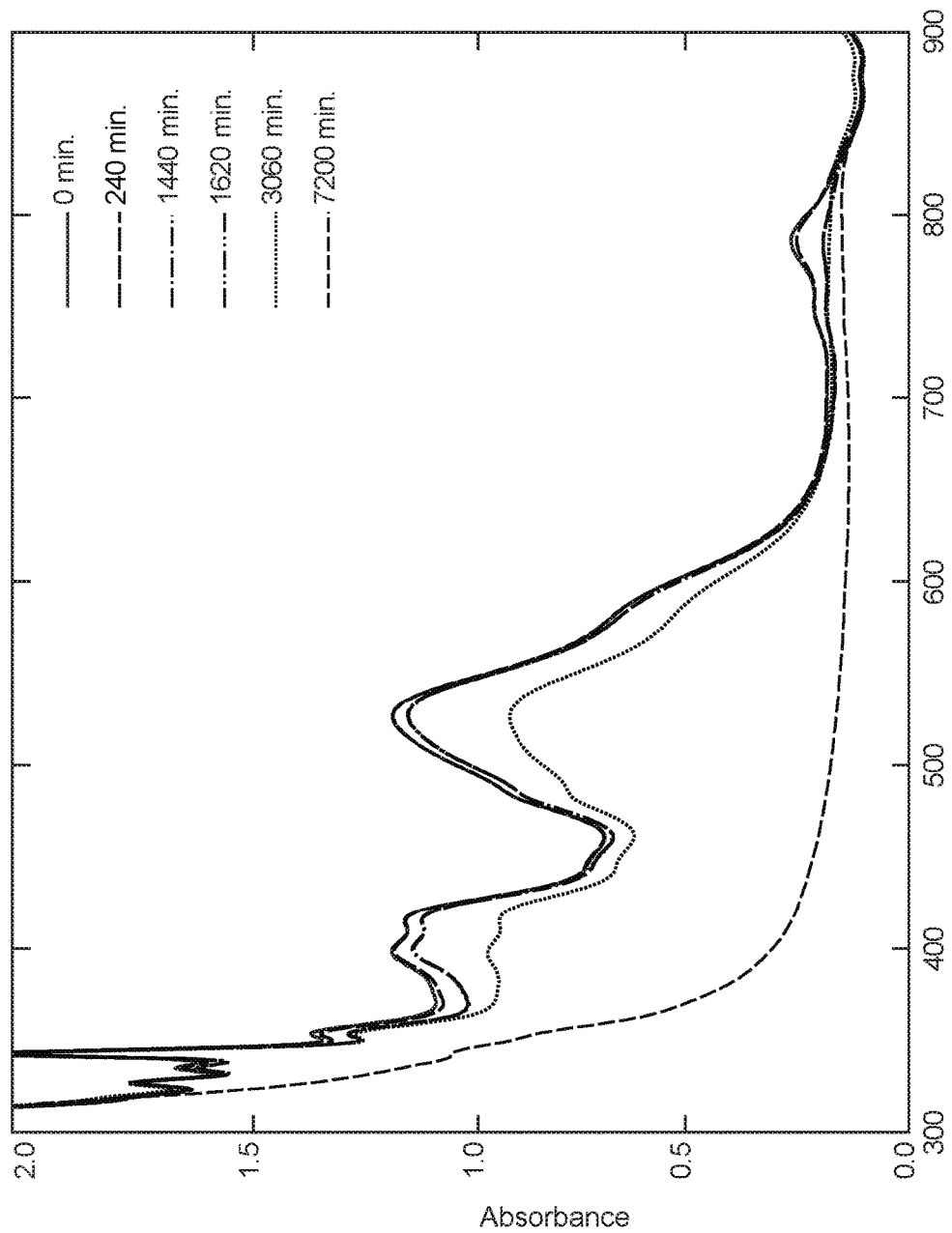
FIG. 1 is a graph showing changes in the absorption spectrum of solution 146-14 with exposure time.

The invisible-fluorescent identification tag for materials includes an invisible-fluorescent tag component, such as an ink or paint, for example. The tag component, after application to a surface, is invisible to the human eye under natural or room lighting. Moreover, the tag component fluoresces at a characteristic non-visible wavelength upon illumination by an appropriate, non-visible UV or IR light source.

The tag composition includes a binder for binding the tag to a surface of a material and a solvent that dissolves both the tag component and binder. Polystyrene, for example, is a suitable binder for tagging textile materials. The skilled artisan will recognize that other, well-known binders are suitable for use with various materials, such as those listed hereinabove.

In order to provide a tag that is significantly more appealing to industrial applications, the hazardous constituents can be replaced with 'greener' materials as much as possible. Additionally, a light stabilization system is needed to reduce or eliminate tag degradation when exposed to light.

Identification and Optimization of a "Green" Solvent System that Solubilizes Both the Selected Tag and Polystyrene Through repeated environmental studies, polystyrene has continually out-performed other binder systems with respect to supporting a protection system for photo-sensitive dyes. For this reason, a "green" solvent system capable of first dissolving polystyrene, and then maintain solubility when mixed with other components, such as the dye and degradation inhibitors, was sought. Previous solvents used to dissolve polystyrene included chloroform and toluene, which were hazardous with respect to health and/or flammability.

α-terpinene (alpha terpinene) and/or γ-terpinene (gamma terpinene) have been identified suitable solvents, having respective boiling points of 174° C. and 183° C. and respective flash points of 46° C. and 51° C. In the regulations, two criteria must be met for a liquid not to be considered a Class 3 flammable:

Boiling Point must be >35° C.

Flash Point must >60° C. closed cup, or >65.6° C.-open cup

Both α-terpinene and γ-terpinene are considered flammable in pure form. However, as one or both are added to polystyrene and other constituents in the overall formulation will reduce the flashpoint to an acceptable level. α-terpinene and/or γ-terpinene can be thus be blended with other constituents that will eliminate the flammability hazard.

Dimethyl sulfoxide (DMSO) is a non-hazardous blending solvent that is compatible with α-terpinene and/or γ-terpinene, polystyrene, and dye components. DMSO has a very high boiling point (189° C.), which has a tendency to increase drying time. A semi-polar, relatively volatile solvent such as acetone, methyl-ethyl-ketone, and methyl-isobutyl-ketone, for example, can be included in the solvent to reduce the drying time. Acetone, for example, has a low health hazard, but the amount used in the solvent should be limited to minimize flammability issues. Suitable composition of the solvent is provided in Table 1 hereinbelow in terms of wt. % of the tag formula.

Light-Stabilization System to Reduce or Eliminate Tag Degradation when Exposed to Light.

A light-stabilized tag formulation is needed that supports longevity under high light conditions by retarding dye degradation, known as photofading. UVA light stabilizers filter harmful UV light and help prevent chemical degradation, color change, and delamination of coatings, adhesives and sealants. Four specific types of light-stabilizing additives have been identified as suitable for inclusion in various embodiments of the present invention.

Light-stabilizing additive type 1: Ultraviolet light absorbers (UVA) are a type of light stabilizer that functions by competing with chromophores to absorb UV radiation. Ultraviolet light absorbers convert harmful UV radiation into harmless infrared radiation or heat. Examples of suitable UVA include hydroxybenzophenone and hydroxyphenylbenzotriazole.

Light-stabilizing additive type 2: Hindered amine light stabilizers (HALS or HAS) scavenge radicals, particularly radicals which are produced by weathering, and can be explained by the formation of nitroxyl radicals through a process known as the Denisov Cycle. The nitroxyl radical (R—O.) combines with free radicals as illustrated below:

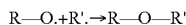

Although there are wide structural differences in the sundry, commercially available HALS products, most of such products comprise the well-known 2,2,6,6-tetramethylpiperidine ring structure. A useful HALS product for carrying out the present invention is presently available under the trade name "Tinuvin® 384-2" which is owned by BASF-SE, Lincoln, Neb. According to a Material Safety Data Sheet published therefor, Tinuvin® 384-2 comprises benzenepropanoic acid, 3-(2H-benzotriazol-2-yl)-5-(1,1-dimethylethyl)-4-hydroxy-, C7-9-branched and linear alkyl esters, and 1-methoxy-2-propylacetate. Other examples of suitable HALS compositions include bis(1,2,2,6,6-pentamethyl-4-piperidinyl)-sebacate and 1-(Methyl)-8-(1,2,2,6,6-pentamethyl-4-piperidinyl)-sebacate. It is contemplated that many HALS preparations are suitable to varying degrees for carrying out the present invention.

Light-stabilizing additive type 3: Singlet oxygen inhibitors return excited states of the chromophores to ground states by an energy transfer process. Examples of singlet oxygen inhibitors include tocopherols, carotenoids, ascorbic acid, butylated hydroxytolune (BHT), butylated hydroxyanisole (BHA) and tertiary butylhydroquinone (TBHQ).

Light-stabilizing additive type 4: Singlet oxygen selective traps reduce the formation of singlet oxygen and reduce complexation with singlet oxygen. Examples of singlet oxygen selective traps include α-terpinene, γ-terpinene and mixtures of the foregoing. Since α-terpinene and/or γ-terpinene have already been described hereinabove as solvents, the function thereof as a light-stabilizer is an added benefit. It has been found that α-terpinene has a higher performance level (photo-stability) per weight basis than γ-terpinene, and is therefore preferable.

All of the light stabilizers described hereinabove are well-known and commercially available, individually and/or in some cases, as blends. Light stabilizers are combined herein to provide synergistic protection of the dye.

General concentration ranges of the tag formula for application to textiles and the like, expressed in wt. %, are described in Table 1.

TABLE 1

| Constituent | Minimum Wt. % | Maximum Wt. % |
|---|---|---|
| Dye (tag component) | 0.001 | 0.25 |
| Polystyrene | 0.2 | 2.0 |
| γ-terpinene and/or α-terpinene* | 2 | 90 |
| Dimethyl sulfoxide | 0 | 10 |
| Acetone | 0 | 50 |
| Ultraviolet light absorber | 0 | 2 |
| Hindered amine light stabilizer | 0 | 2 |
| Singlet oxygen inhibitor | 0 | 5 |
| Singlet oxygen selective trap* | 2 | 90 |

*Same constituent having dual functions

Naphthalocyanine dye compounds were selected for use as suitable tag material.

EXAMPLES

Intrinsic photo-stability of each of seven naphthalocyanine dye candidates was tested in order to determine suitability for use in the present invention. Approximately 0.02 g of each candidate dye was dissolved in about 35 g tetrahydrofuran (THF) and placed in 1 cm cuvette for photolysis testing.

Each of the candidate dye solutions was exposed to a high intensity 500 W Xe/HgXe arc lamp with a grating set to pass 350 nm light, a single frequency of ultraviolet (UV) light, which is known to be the most photolytic (damaging) light band with respect to photo-stability. The samples were periodically, briefly removed from exposure for UV/Vis spectroscopic analysis of the dye absorption properties thereof, and replaced for continued exposure. Decrease in absorption is a key indication that the dye has degraded. Specific candidate dyes and photolysis results are summarized below.

Sample 146-14 comprised gallium(III) 2,3-naphthalocyanine chloride, assigned Chemical Abstracts Service (CAS) No. 142700-78-5 and a structure:

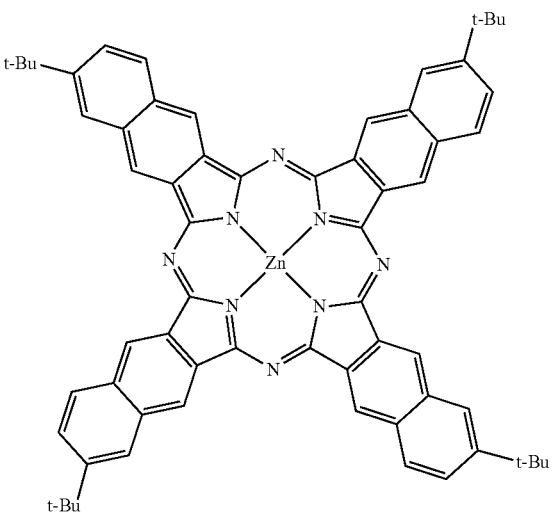

Sample 146-14 was dissolved in THF to obtain a concentration of $9.78 \times 10^{-7}$ M. FIG. 1 illustrates the change in the absorption spectrum of solution as a function of exposure time. The sample appeared to undergo slow photodegradation with time. After 51 hours of exposure about 30% of the dye was lost. Total degradation was apparent after 120 hours of exposure.

Figure 2:
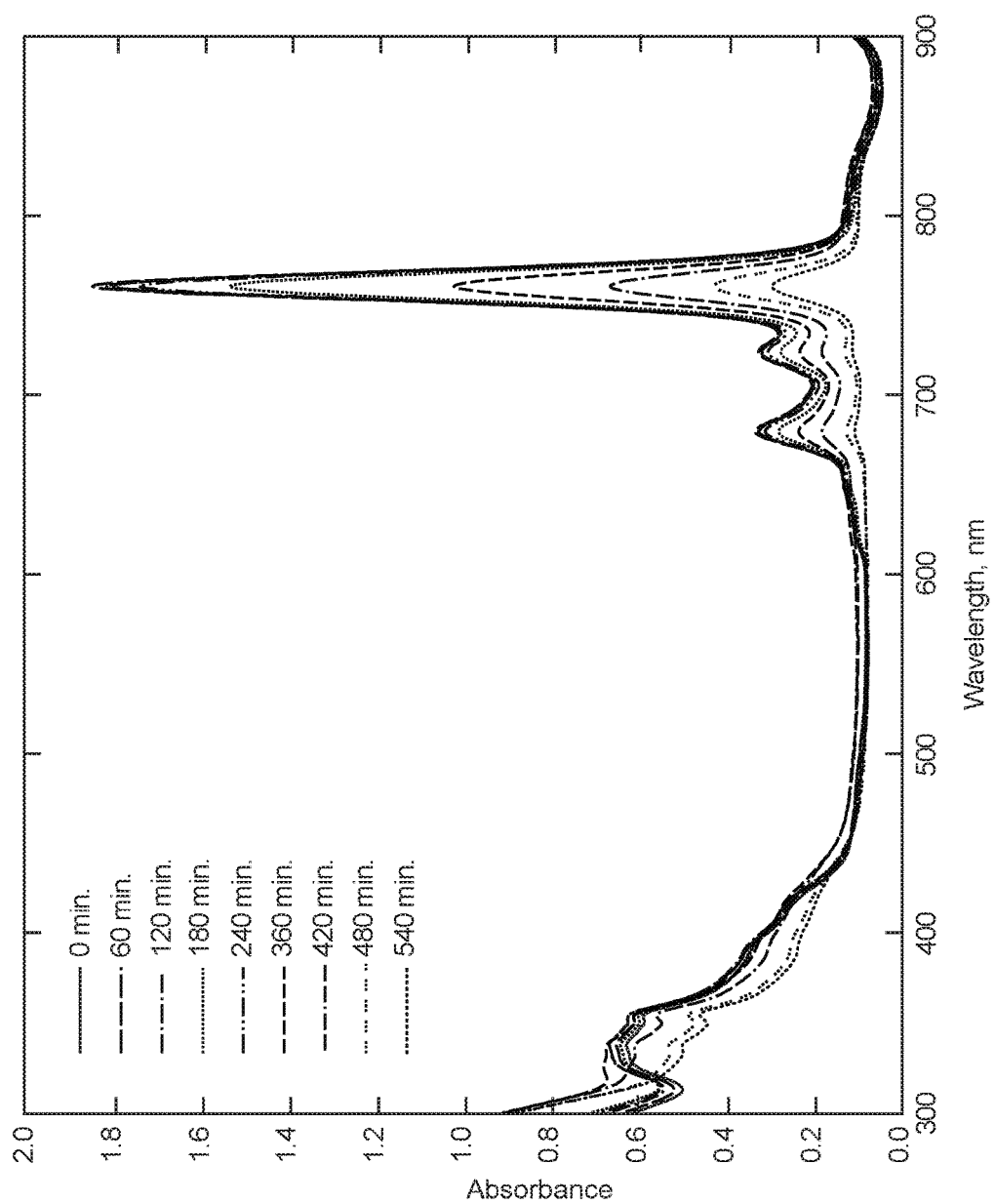
FIG. 2 is a graph showing changes in the absorption spectrum of solution 146-15 with exposure time.

Sample 146-15 comprised zinc 2,11,20,29-tetra-tert-butyl-2,3-naphthalocyanine, assigned CAS No. 39049-43-9 and a structure:

Sample 146-15 was dissolved in THF to obtain a concentration of $2.6 \times 10^{-9}$ M. FIG. 2 illustrates the change in the absorption spectrum of solution as a function of exposure time. Almost 90% of the dye degraded after 9 hours of exposure.

Sample 146-16 comprised 2,11,20,29-tetra-tert-butyl-2,3-naphthalocyanine, assigned CAS No. 58687-99-3 and a structure:

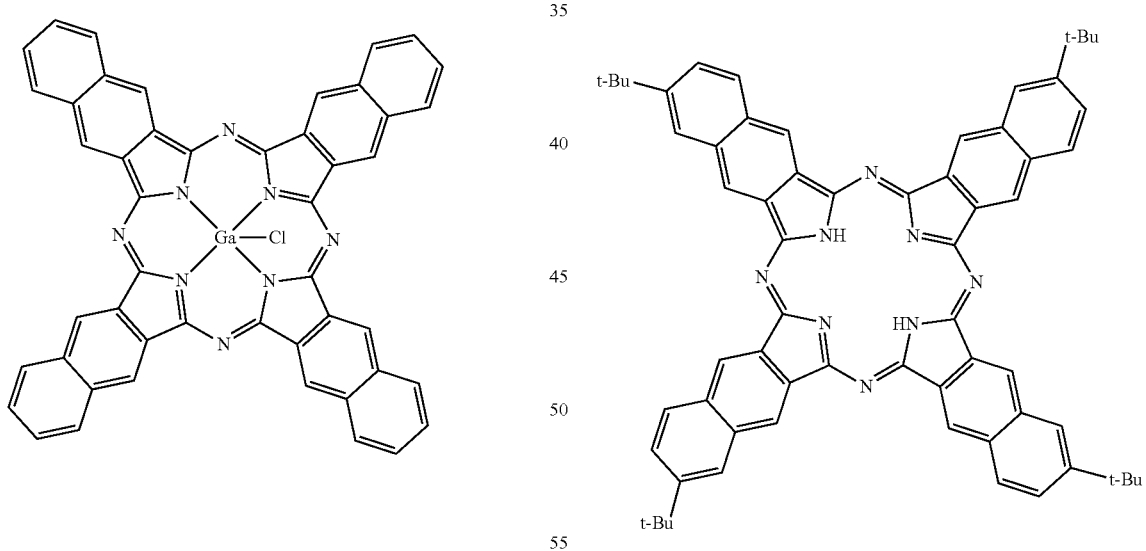

Figure 3:
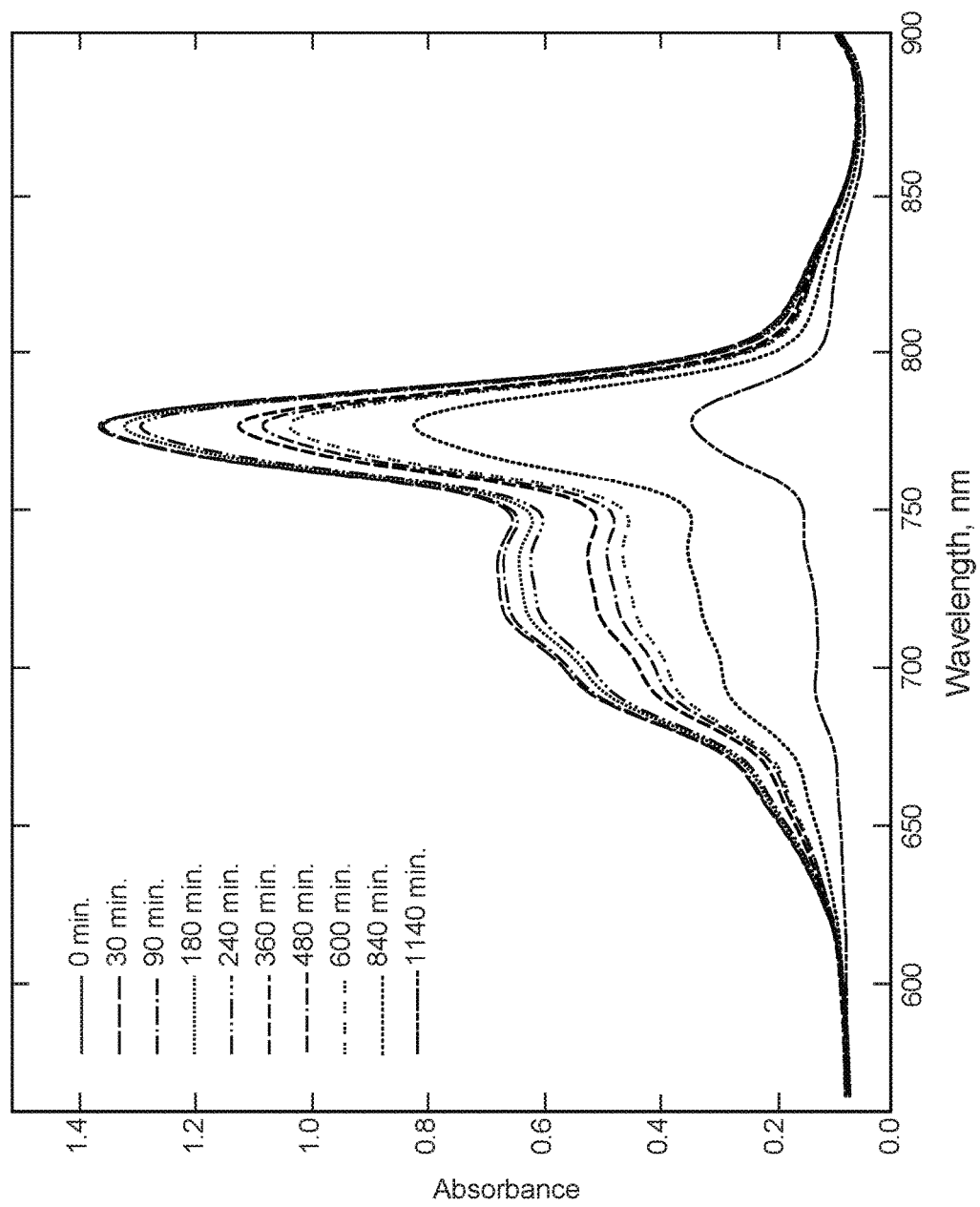
FIG. 3 is a graph showing changes in the absorption spectrum of solution 146-16 with exposure time.

Sample 146-16 was dissolved in THF to obtain a concentration of $5.9 \times 10^{-8}$ M. FIG. 3 illustrates the change in the absorption spectrum of solution as a function of exposure time. As the data indicates, after 19 hours of exposure at 350 nm almost 80% of the dye was lost.

Sample 146-19 comprised 5,9,14,18,23,27,32,36-octabutoxy-2,3-naphthalocyanine, assigned CAS No. 105528-25-4 and a structure:

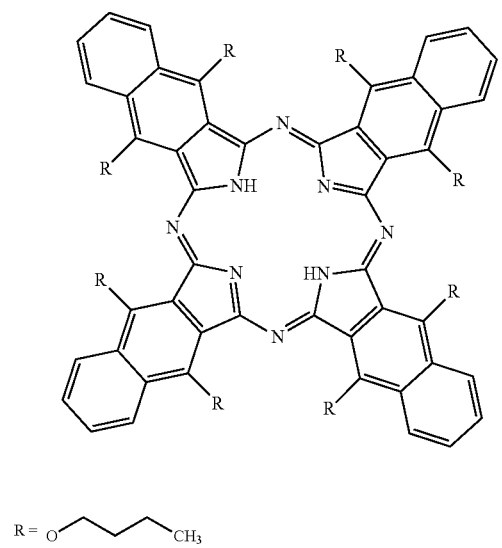

R = O-CH₂CH₂CH₂CH₃

Figure 4:
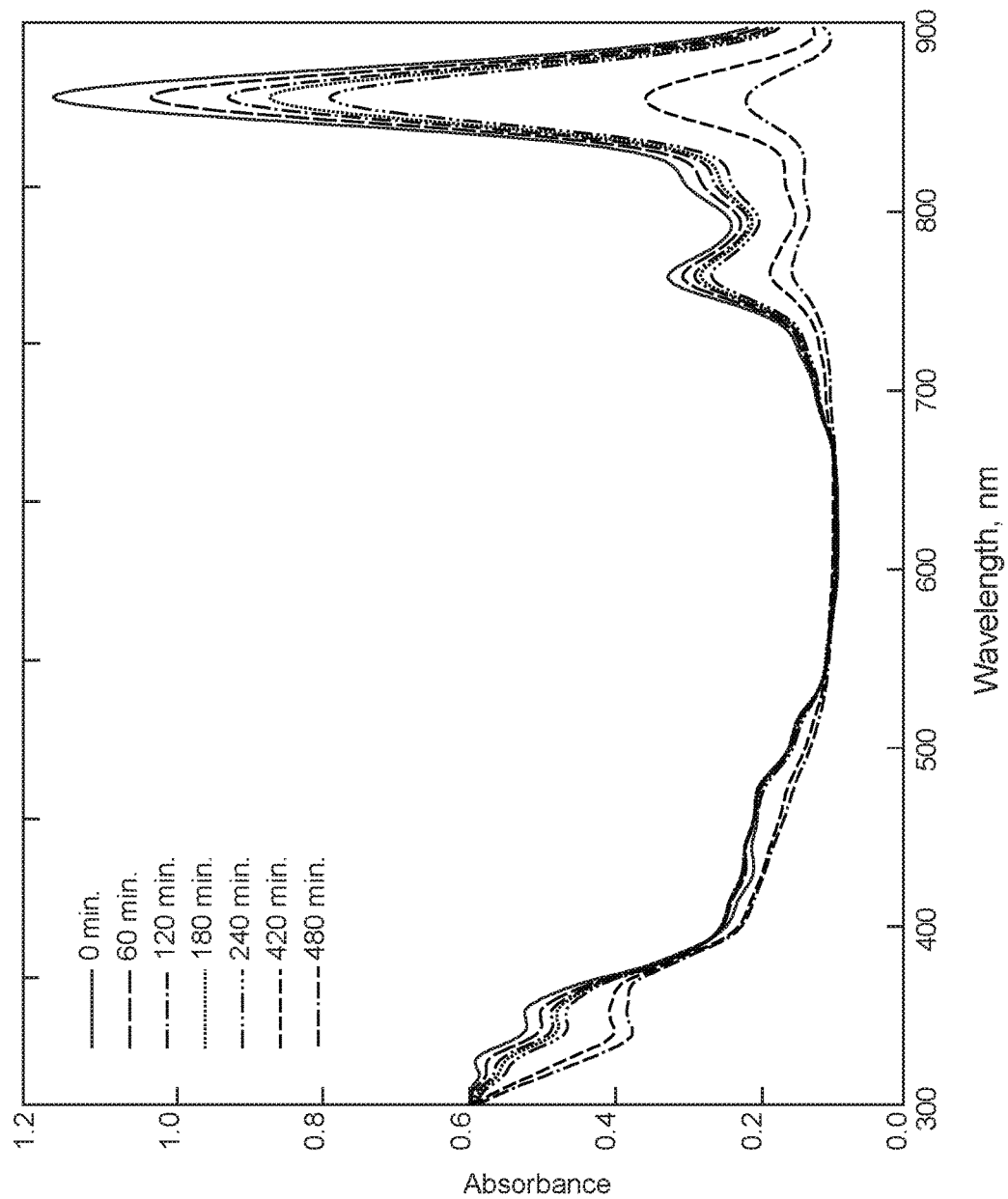
FIG. 4 is a graph showing changes in the absorption spectrum of solution 146-19 with exposure time.

Sample 146-19 was dissolved in THF to obtain a concentration of $4.7 \times 10^{-9}$ M. FIG. 4 illustrates the change in the absorption spectrum of solution as a function of exposure time. It is clear from the data that after 8 hours of exposure at 350 nm, almost 80% of the dye was lost.

Sample 146-20 comprised copper(II) 5,9,14,18,23,27,32,36-octabutoxy-2,3-naphthalocyanine, assigned CAS No. 155773-67-4 and a structure:

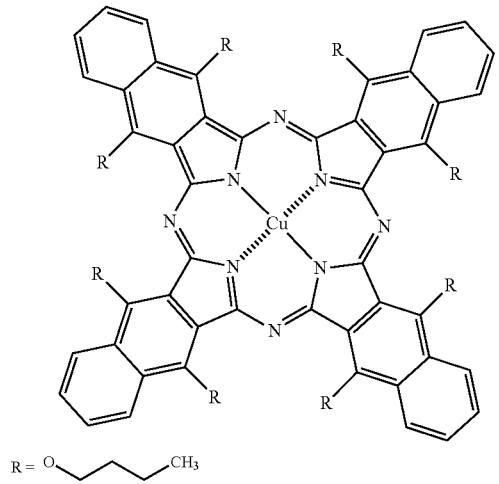

R = O-CH₂CH₂CH₂CH₃

Figure 5:
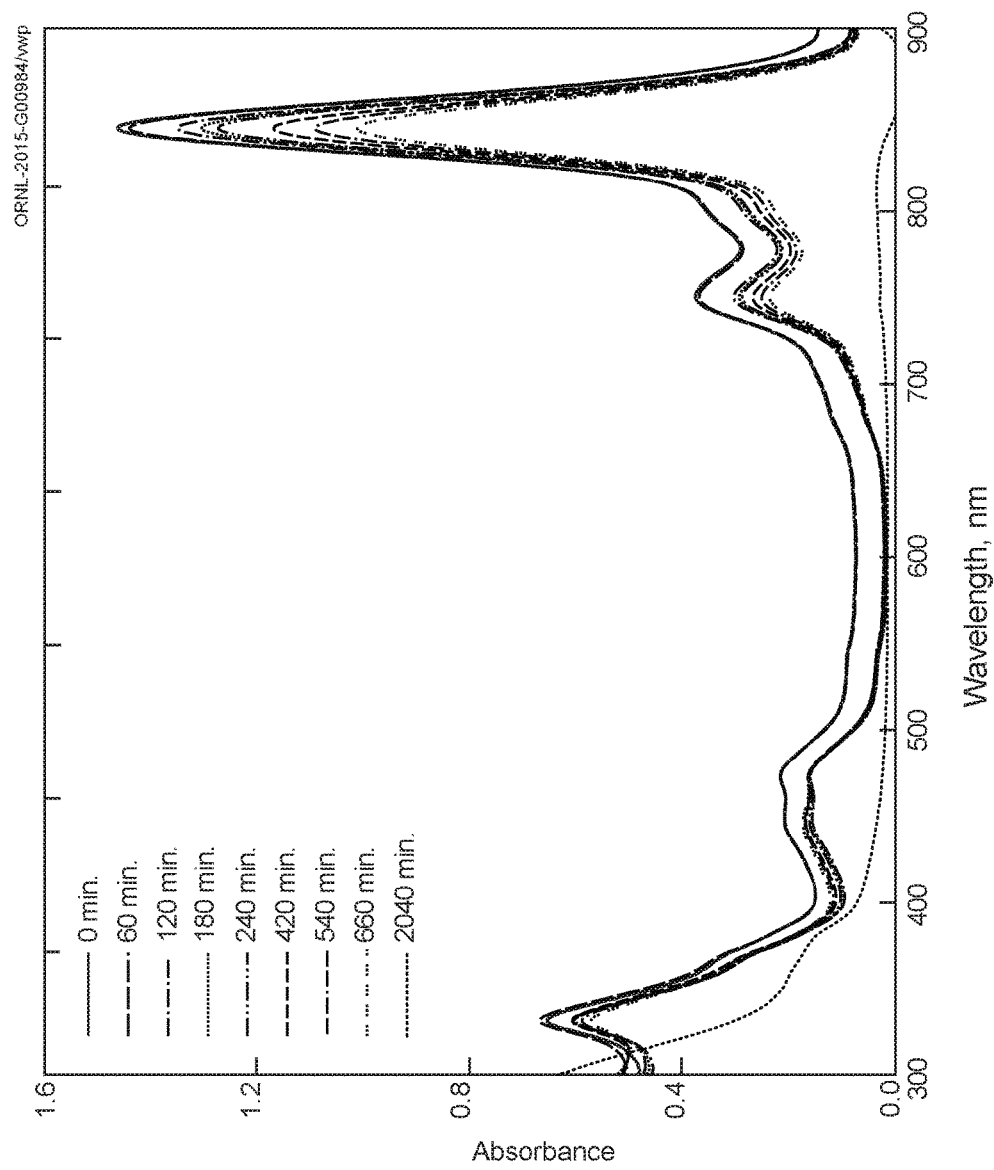
FIG. 5 is a graph showing changes in the absorption spectrum of solution 146-20 with exposure time.

Sample 146-20 was dissolved in THF to obtain a concentration of $1.1 \times 10^{-9}$ M. FIG. 5 illustrates the change in the absorption spectrum of solution as a function of exposure time. As the data reveals after 11 hours of exposure about 30% of the dye degraded. Complete degradation of the dye was seen after 34 hours of exposure.

Sample 146-21 comprised nickel(II) 5,9,14,18,23,27,32,36-octabutoxy-2,3-naphthalocyanine, assigned CAS No. 155773-70-9 and a structure:

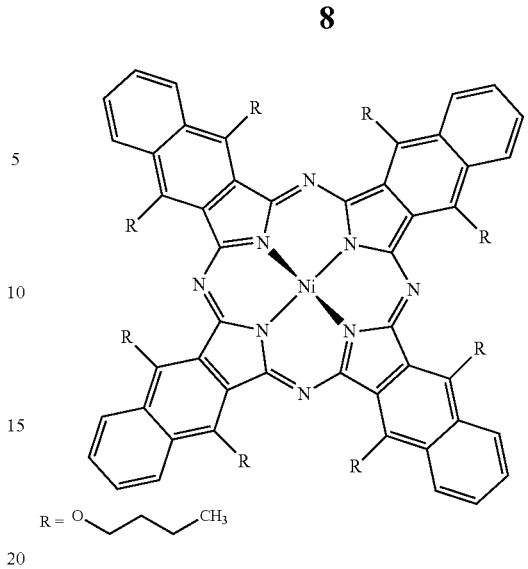

R = O-CH₂CH₂CH₂CH₃

Figure 6:
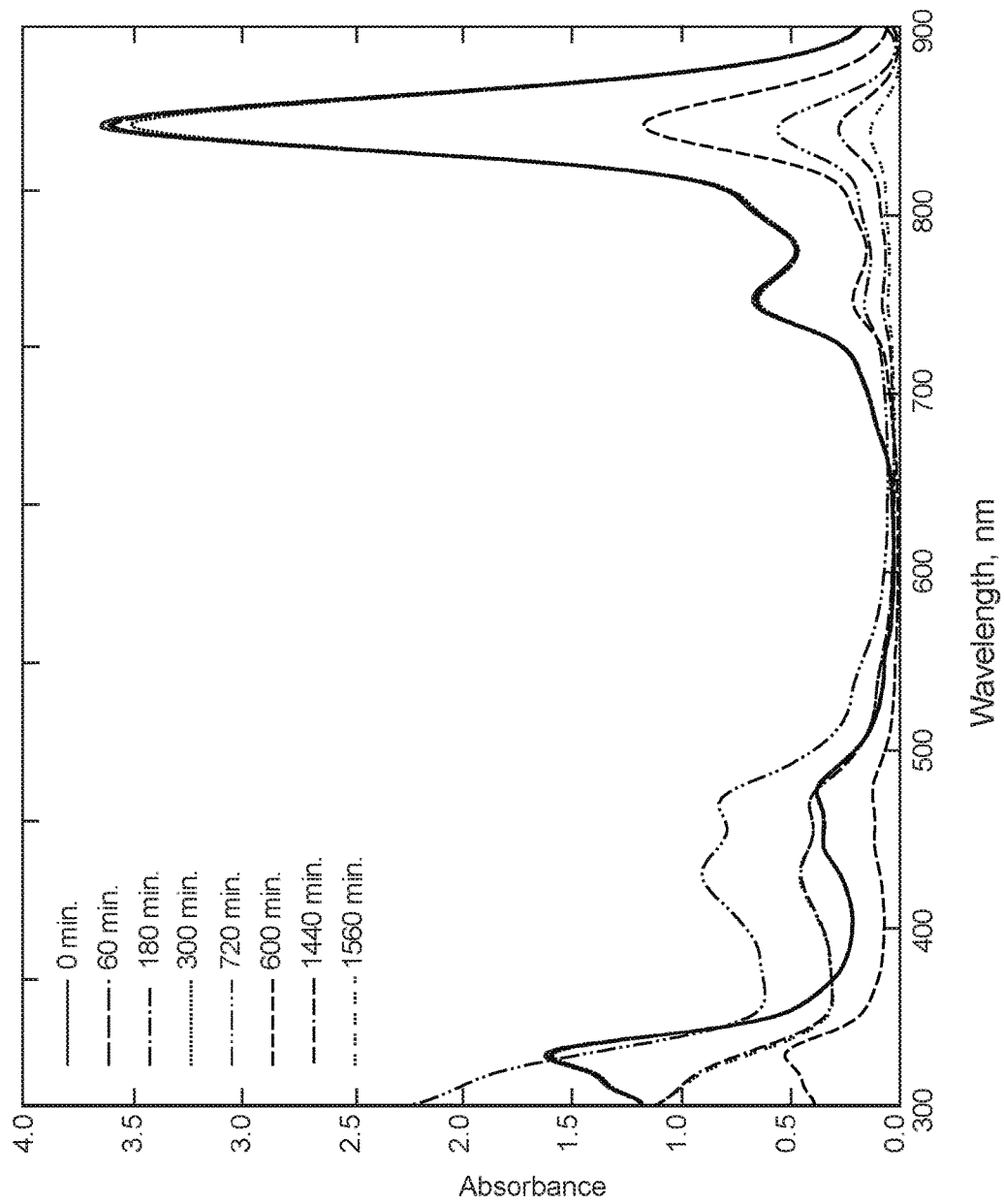
FIG. 6 is a graph showing changes in the absorption spectrum of solution 146-21 with exposure time.

Sample 146-21 was dissolved in THF to obtain a concentration of $1.4 \times 10^{-9}$ M. FIG. 6 illustrates the change in the absorption spectrum of solution as a function of exposure time. As the data reveals, dye degradation was very slow initially (after 5 hours of exposure less than 10% loss) but became faster as exposure proceeded (almost 60% loss after 10 hours of exposure). Almost complete dye degradation was observed after 26 hours of exposure.

Sample 146-22 comprised silicon 2,3-naphthalocyanine bis(trihexylsilyloxide), assigned CAS No. 92396-88-8 and a structure:

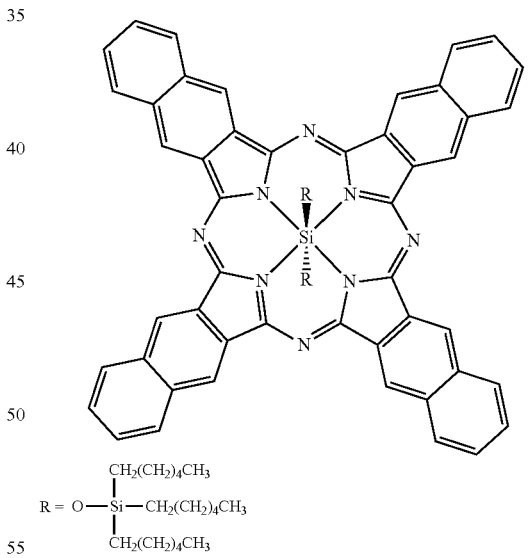

R = O—Si(CH₂(CH₂)₄CH₃)₃

Figure 7:
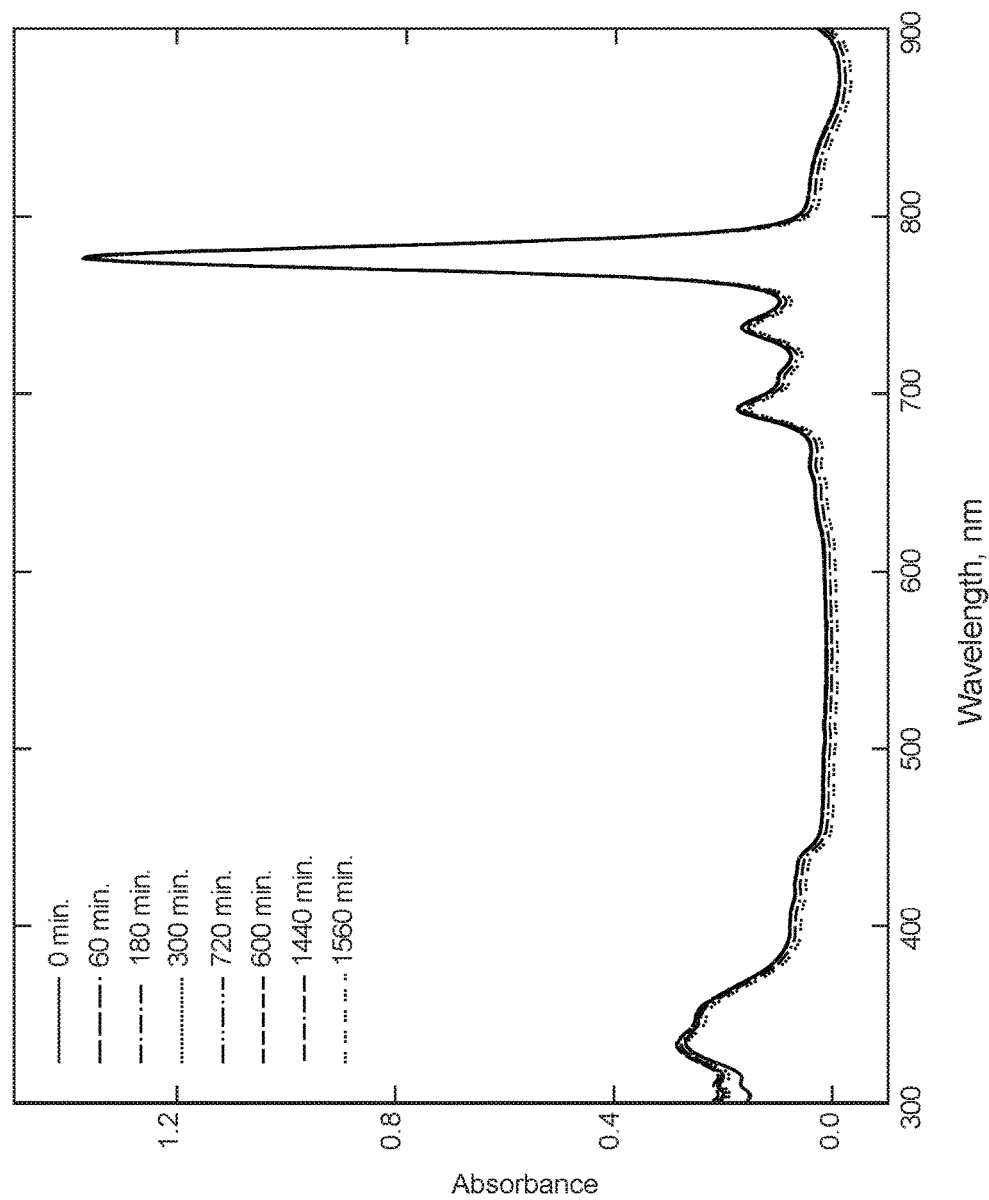
FIG. 7 is a graph showing changes in the absorption spectrum of solution 146-22 with exposure time.

Sample 146-22 was dissolved in THF to obtain a concentration of $1.7 \times 10^{-9}$ M. FIG. 7 illustrates the change in the absorption spectrum of solution as a function of exposure time. It is clear from the data that no significant dye degradation takes place even after 48 hours of exposure to 350 nm exposure.

The 146-22 sample showed suitable stability to UV light for practical applications; therefore, further testing was warranted. A solution of Sample 146-22 and light-stabilizing additives as described in Table 2 was prepared.

TABLE 2

| Constituent | Amount |
| --- | --- |
| silicon 2,3-naphthalocyanine bis(trihexylsilyloxide) (Sample 146-22) | 0.00050 g |
| Tinuvin ® 384-2 | 0.50 g |
| Butylated hydroxytolune | 1.0 g |
| Alpha-terpinene | 3.5 g |
| Tetrahydrofuran | 31 g |
| Polystyrene | 1.0 g |

Figure 8:
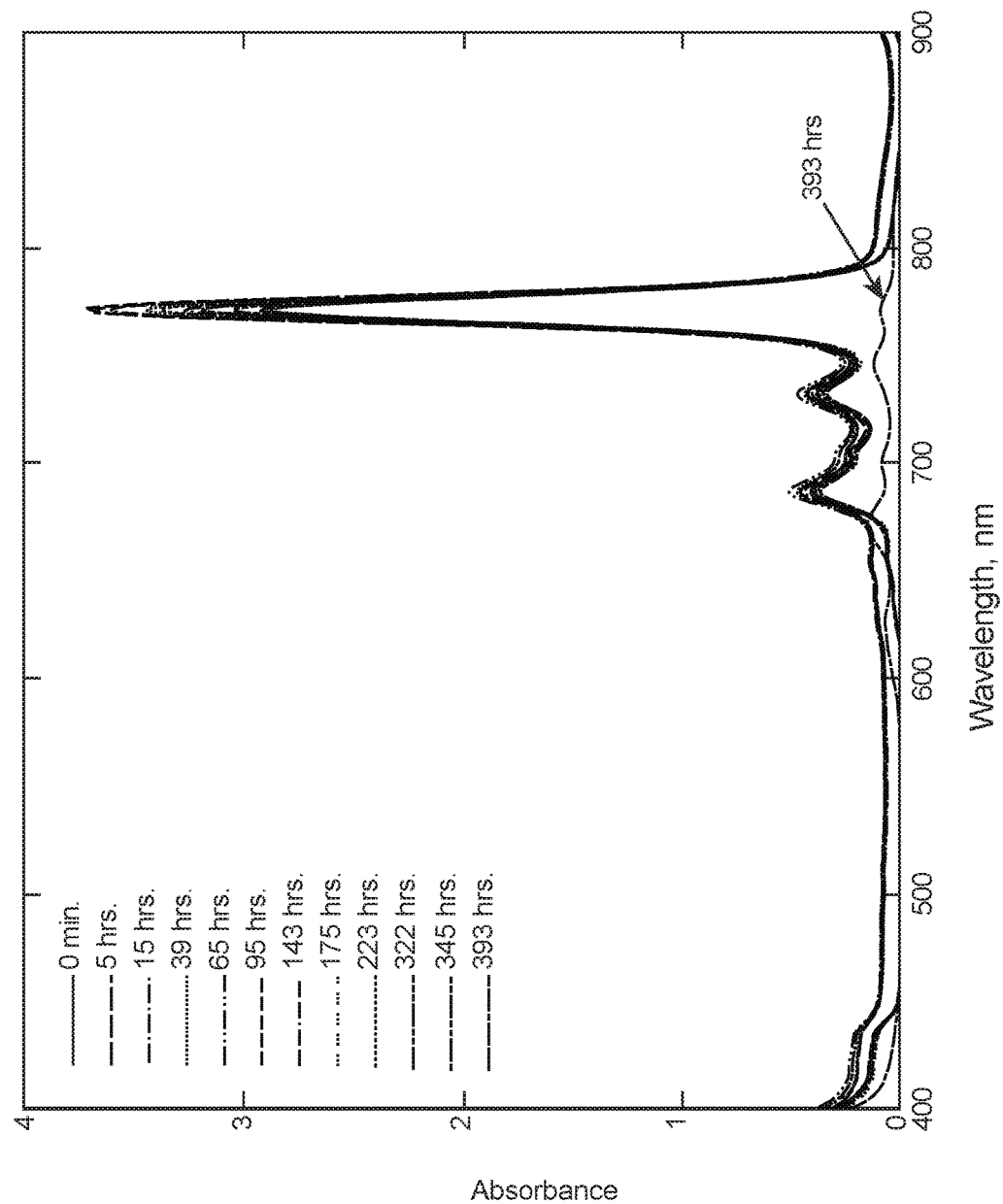
FIG. 8 is a graph showing changes in the absorption spectrum of solution 146-22 including light-stabilizing additives with exposure time.

The solution was exposed to UV light at 350 nm as described hereinabove for 16.5 days, and the change in its absorbance with exposure time was followed. FIG. 8 illustrates the change in the absorption spectrum of solution as a function of exposure time. As the data shows, no significant change was observed in the absorbance even after 14.5 days of photolysis. Although the dye survived exposure for 14.5 days, during the last 2 days of photolysis (from 14.5 days to 16.5 days) almost all of the dye degraded. It is not clear why and how the degradation took place so quickly over the last two days. However, good performance of the dye under such harsh testing conditions is an indication that the dye is suitable for use in a textile-tagging system.

The invention is useful at least in identifying sundry materials such as, for example, raw materials, textiles, apparels, garments, accessories, equipment, instruments, devices, and other security and/or consumer products, components, and the like.

While there has been shown and described what are at present considered to be examples of the invention, it will be obvious to those skilled in the art that various changes and modifications can be prepared therein without departing from the scope of the inventions defined by the appended claims.

What is claimed is:

1. A tag composition comprising:
   a. a tag component that is invisible in light of the visible spectrum and which emits fluorescent light in a non-visible spectrum under a non-visible excitation energy, said tag component comprising a naphthalocyanine compound;
   b. a binder for binding said tag component to a surface of a material; and
   c. a solvent comprising a terpinene, wherein said tag component and said binder are dissolved in said solvent.

2. A tag composition in accordance with claim 1 wherein said naphthalocyanine compound is 2,3-naphthalocyanine bis(trihexylsilyloxide).

3. A tag composition in accordance with claim 1 wherein said binder is polystyrene.

4. A tag composition in accordance with claim 1 wherein said terpinene comprises α-terpinene.

5. A tag composition in accordance with claim 1 wherein said solvent further comprises dimethyl sulfoxide.

6. A tag composition in accordance with claim 1 wherein said solvent further comprises acetone.

7. A tag composition in accordance with claim 1 further comprising a light-stabilizing additive.

8. A tag composition in accordance with claim 7 wherein said light-stabilizing additive comprises an ultraviolet light absorber.

9. A tag composition in accordance with claim 8 wherein said ultraviolet light absorber is at least one composition selected from the group consisting of hydroxybenzophenone and hydroxyphenylbenzotriazole.

10. A tag composition in accordance with claim 7 wherein said light-stabilizing additive comprises a hindered amine light stabilizer.

11. A tag composition in accordance with claim 10 wherein said hindered amine light stabilizer is a composition comprising benzenepropanoic acid, 3-(2H-benzotriazol-2-yl)-5-(1,1-dimethylethyl)-4-hydroxy-, C7-9-branched and linear alkyl esters, and 1-methoxy-2-propylacetate.

12. A tag composition in accordance with claim 7 wherein said light-stabilizing additive comprises a singlet oxygen inhibitor.

13. A tag composition in accordance with claim 12 wherein said singlet oxygen inhibitor is at least one composition selected from the group consisting of a tocopherol, a carotenoid, ascorbic acid, butylated hydroxytolune, butylated hydroxyanisole, and tertiary butylhydroquinone.

14. A tag composition in accordance with claim 7 wherein said light-stabilizing additive comprises a singlet oxygen selective trap.

15. A tag composition in accordance with claim 14 wherein said singlet oxygen selective trap is at least one composition selected from the group consisting of α-terpinene and γ-terpinene.

16. A tag composition comprising:
   a. a tag component that is invisible in light of the visible spectrum and which emits fluorescent light in a non-visible spectrum under a non-visible excitation energy, said tag component comprising 2,3-naphthalocyanine bis(trihexylsilyloxide);
   b. a polystyrene binder for binding said tag component to a surface of a material;
   c. a solvent comprising α-terpinene, dimethyl sulfoxide, and acetone, wherein said tag component and said polystyrene binder are dissolved in said solvent; and
   d. a light-stabilizing additive comprising at least one additive selected from the group consisting of an ultraviolet light absorber, a hindered amine light stabilizer, a singlet oxygen inhibitor, and a singlet oxygen selective trap.

17. A tag composition in accordance with claim 16 wherein said ultraviolet light absorber is at least one composition selected from the group consisting of hydroxybenzophenone and hydroxyphenylbenzotriazole.

18. A tag composition in accordance with claim 16 wherein said hindered amine light stabilizer is a composition comprising benzenepropanoic acid, 3-(2H-benzotriazol-2-yl)-5-(1,1-dimethylethyl)-4-hydroxy-, C7-9-branched and linear alkyl esters, and 1-methoxy-2-propylacetate.

19. A tag composition in accordance with claim 16 wherein said singlet oxygen inhibitor is at least one composition selected from the group consisting of a tocopherol, a carotenoid, ascorbic acid, butylated hydroxytolune, butylated hydroxyanisole, and tertiary butylhydroquinone.

20. A tag composition in accordance with claim 16 wherein said singlet oxygen selective trap is at least one composition selected from the group consisting of α-terpinene and γ-terpinene.

21. A tagged article comprising a material having an invisible-fluorescent identification tag disposed on a surface thereof, said tag comprising a tag component that is invisible in light of the visible spectrum and which emits fluorescent light in a non-visible spectrum under a non-visible excitation energy, and a light-stabilizing additive selected from the group consisting of a hindered amine light stabilizer, a singlet oxygen inhibitor, and a singlet oxygen selective trap, said tag component comprising a naphthalocyanine compound, and a binder for binding said tag component to said surface of said material.

22. A tagged article in accordance with claim 21 wherein said naphthalocyanine compound is 2,3-naphthalocyanine bis(trihexylsilyloxide).

23. A tagged article in accordance with claim 21 wherein said binder is polystyrene.

24. A tagged article in accordance with claim 21, further comprising an ultraviolet light absorber.

25. A tagged article in accordance with claim 24 wherein said ultraviolet light absorber is at least one composition selected from the group consisting of hydroxybenzophenone and hydroxyphenylbenzotriazole.

26. A tagged article in accordance with claim 21 wherein said hindered amine light stabilizer is a composition comprising benzenepropanoic acid, 3-(2H-benzotriazol-2-yl)-5-(1,1-dimethylethyl)-4-hydroxy-, C7-9-branched and linear alkyl esters, and 1-methoxy-2-propylacetate.

27. A tagged article in accordance with claim 21 wherein said singlet oxygen inhibitor is at least one composition selected from the group consisting of a tocopherol, a carotenoid, ascorbic acid, butylated hydroxytolune, butylated hydroxyanisole, and tertiary butylhydroquinone.

28. A tagged article in accordance with claim 21 wherein said singlet oxygen selective trap is at least one composition selected from the group consisting of α-terpinene and γ-terpinene.

29. A tag composition comprising:
a. a tag component that is invisible in light of the visible spectrum and which emits fluorescent light in a non-visible spectrum under a non-visible excitation energy, said tag component comprising a naphthalocyanine compound;
b. a binder for binding said tag component to a surface of a material; and
c. a solvent, wherein said tag component and said binder are dissolved in said solvent; and
d. a hindered amine light stabilizer.

30. A tag composition comprising:
a. a tag component that is invisible in light of the visible spectrum and which emits fluorescent light in a non-visible spectrum under a non-visible excitation energy, said tag component comprising a naphthalocyanine compound;
b. a binder for binding said tag component to a surface of a material; and
c. a solvent, wherein said tag component and said binder are dissolved in said solvent; and
d. a composition comprising benzenepropanoic acid, 3-(2H-benzotriazol-2-yl)-5-(1,1-dimethylethyl)-4-hydroxy-, C7-9-branched and linear alkyl esters, and 1-methoxy-2-propylacetate.

31. A tag composition comprising:
a. a tag component that is invisible in light of the visible spectrum and which emits fluorescent light in a non-visible spectrum under a non-visible excitation energy, said tag component comprising a naphthalocyanine compound;
b. a binder for binding said tag component to a surface of a material; and
c. a solvent, wherein said tag component and said binder are dissolved in said solvent; and
d. a singlet oxygen inhibitor.

32. A tag composition comprising:
a. a tag component that is invisible in light of the visible spectrum and which emits fluorescent light in a non-visible spectrum under a non-visible excitation energy, said tag component comprising a naphthalocyanine compound;
b. a binder for binding said tag component to a surface of a material; and
c. a solvent, wherein said tag component and said binder are dissolved in said solvent; and
d. a singlet oxygen selective trap.

* * * * *